UNITED STATES PATENT OFFICE.

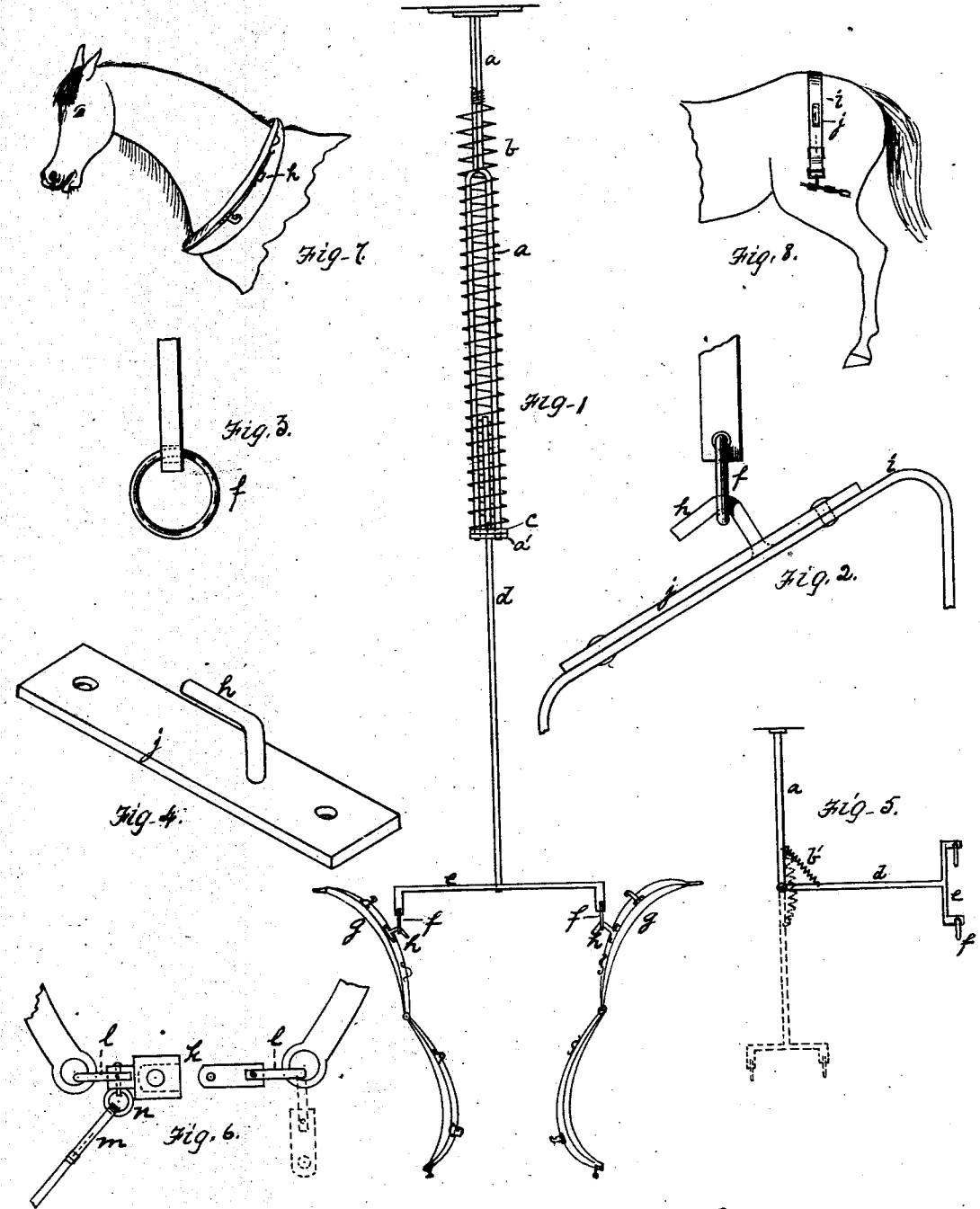

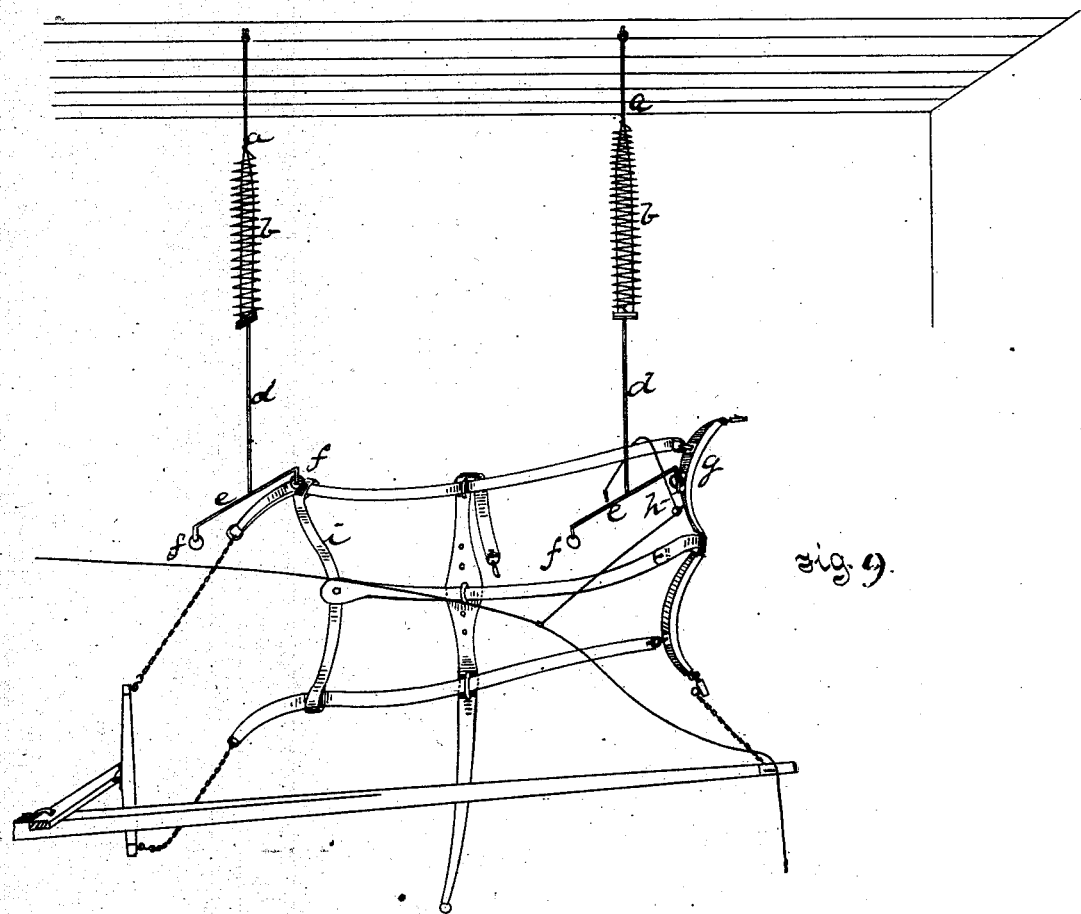

ROBERT HUDIE, OF ALLEGHENY, PENNSYLVANIA.

FIRE-SERVICE HARNESS.

SPECIFICATION forming part of Letters Patent No. 236,952, dated January 25, 1881.

Application filed September 4, 1880. (No model.)

*To all whom it may concern:*

Be it known that I, ROBERT HUDIE, of Allegheny, in the county of Allegheny and State of Pennsylvania, have invented a new and useful Improvement in Fire-Service Harness; and I do hereby declare the following to be a full, clear, and exact description thereof, reference being had to the accompanying drawings, forming a part of this specification, in which—

Figure 1 is an elevation of my improved fire-service-harness bracket or hanger, showing how it supports the harness. Fig. 2 illustrates the support of the back part of the harness by means of the hip-strap. Figs. 3 and 4 are details. Fig. 5 is a view of a modified form of bracket. Fig. 6 shows the construction of the harness and the attachment of the breast-strap; and Figs. 7 and 8 illustrate how the harness is dropped onto the horses. Fig. 9 is a perspective view of the hangers, with one set of harness suspended, the other set of harness having been omitted for the sake of clearness.

Like letters of reference indicate like parts in each.

My invention relates to the construction of apparatus for suspending harness, (such as fire-service harness,) and in harness provided with attachments which adapt it for use with the suspension apparatus; and it consists, first, in a suspension device for harness having a suspension-bracket, in combination with a retractible spring-hanger provided with a horizontal cross-bar and attaching-rings adapted to receive and support a harness; and also in a harness provided with upwardly-turned suspension-hooks, one attached to or near the hames and the other to the hip-strap of the harness, whereby the hooks are adapted to engage with the eyes or rings of the suspension device, and the weight of the harness is utilized to turn the hooks thereon, so as to prevent them from escaping from the rings of the suspension device, all of which will hereinafter more fully appear.

To enable others skilled in the art to make and use my invention, I will now describe its construction and operation.

The drawings show the use of the bracket with a double harness. It has a forked bar, $a$, fastened to the ceiling, on the lower end of which is a plate, $a'$. On the bar $a$, and fastened to it near the upper end, is a spiral spring, $b$, the lower end of which is fastened to a plate, $c$. Extending through and fastened to plate $c$ is a rod or stem, $d$, on the lower end of which is a cross-bar, $e$, provided at the ends with rings $f$. The outer hame, $g$, of each harness is provided with a bent pin or hook, $h$, projecting upward. The front part of the harness is sustained by this hook $h$, the weight of the harness holding it securely in place. When the hames are loosened from the horse the outer one is raised until the hook turns downward, and it is then hooked in the ring $f$. When the horse comes under to be harnessed the hame does not have to be unhooked, but is simply drawn onto the horse, the act of drawing it down causing the hook to come to an upright position and slip out of the ring.

In some of the former devices known to me the unloosening of the harness from the hanger is a separate operation, and while the saving of time thus effected is not very great, it is extremely important under the circumstances.

The former devices known to me are fastening devices, and it sometimes happens that they get out of order and require considerable time to unfasten. This cannot happen with my construction.

The same device is used at the back part of the harness. There the hook $h$ is fastened on the outer part of the hip-strap $i$, being mounted thereon by means of a plate, $j$, riveted to the strap. The hook $h$ is placed near one end of the plate, and projects inward, as shown in Fig. 4, so that the long end of the plate, acting as a weight, shall tip the hook over, as shown in Fig. 2, and thus cause it to hang in the ring $f$. When the harness is drawn down onto the horse the hook tips the other way and slips out of the ring. When the harness is on the horse the hook $h$ points upward.

Two brackets are used for each single harness, or for each pair of double harness, one at the front and one at the back.

It has been customary to fasten the hames around the collar by a spring-snap, welded or riveted to the hames. This makes them very stiff, unyielding, and hard upon the horses. and is often the cause of balking. If the load were on one side, as in turning, the other side of the collar would be thrown forward against the horse's neck. I have remedied this by attaching the snap $k$ to the hame by a looselypivoted link, *l*, which permits the hame to yield sufficiently to lie snugly to the shoulder and accommodate itself to the pressure.

In double harness the breast or pole strap has generally been connected to the harness by a strap extending between and fastened to the hames. Then when the horses were hitched, this strap, which, when unhitched, hung loose at one end, had to be hooked onto the other hame. I fasten the breast-strap *m* permanently to the inner hame by means of a ring and staple, *n*. Then it is never detached from the harness, and does not have to be fastened in hitching. The other end of the breast-strap remains fastened to the pole.

Fig. 5 shows a modified form of hanger. This is used when the ceiling is low. The stem *d* is hinged to the bar *a*, and a spring, *b'*, is fastened to each part, so that when the weight of the harness is taken off the retraction of the taut spring causes the stem *d* to be drawn up sidewise out of the way, as shown in Fig. 5.

These improvements have all been tested by actual use, and have all proved highly beneficial. While they may appear small in themselves, they go to the perfection of the fire service, and to reducing the time necessary in answering an alarm, in which a minute's delay may result in great loss.

What I claim as my invention, and desire to secure by Letters Patent, is—

1. In a suspension device for harness, the combination of the suspension-bracket and retractible spring-hanger provided with the horizontal cross-bar and attaching ring or rings, adapted to receive and support the harness, substantially as and for the purpose specified.

2. A harness provided with the upwardly-turned suspension-hooks, one attached to or near the hames and the other to the hip-strap of the harness, and adapted to engage with rings or eyes of the suspension apparatus, substantially as specified.

In testimony whereof I have hereunto set my hand.

ROBERT HUDIE.

Witnesses:
R. H. WHITTLESEY,
T. B. KERR.